United States Patent [19]

Inoue

[11] Patent Number: 5,513,016
[45] Date of Patent: Apr. 30, 1996

[54] METHOD AND APPARATUS FOR PROCESSING IMAGE SIGNAL

[75] Inventor: Yoshiaki Inoue, Kanagawa, Japan

[73] Assignee: Fuji Photo Film Co., Kanagawa, Japan

[21] Appl. No.: 254,421

[22] Filed: Jun. 6, 1994

Related U.S. Application Data

[63] Continuation of Ser. No. 779,319, Oct. 18, 1991, abandoned.

[30] Foreign Application Priority Data

Oct. 19, 1990 [JP] Japan .................................. 2-281079
Oct. 19, 1990 [JP] Japan .................................. 2-281080

[51] Int. Cl.$^6$ ........................................................ H04N 1/40
[52] U.S. Cl. ........................... 358/456; 358/454; 358/463
[58] Field of Search ................................. 358/447, 455, 358/456, 461, 462, 463, 454

[56] References Cited

U.S. PATENT DOCUMENTS

| | | | |
|---|---|---|---|
| 4,403,257 | 9/1983 | Hsieh | 358/460 |
| 4,536,803 | 8/1985 | Hennig | 358/447 |
| 4,823,194 | 4/1989 | Mishima et al. | 358/455 |
| 4,868,671 | 9/1989 | Murakami | 358/447 |
| 4,953,013 | 7/1990 | Tsugi et al. | 358/447 |
| 4,969,051 | 11/1990 | Sasaki | 358/462 |
| 5,001,573 | 3/1991 | Sakamoto et al. | 358/447 |
| 5,051,842 | 9/1991 | Shimazaki | 358/447 |
| 5,065,255 | 11/1991 | Kimura et al. | 358/447 |
| 5,130,820 | 7/1992 | Hirota | 358/447 |
| 5,140,441 | 8/1992 | Sugiura et al. | 358/456 |
| 5,177,795 | 7/1993 | Tanioka et al. | 358/462 |
| 5,387,983 | 2/1995 | Sugiura et al. | 358/458 |

*Primary Examiner*—Edward L. Coles, Sr.
*Assistant Examiner*—Thomas L. Stoll
*Attorney, Agent, or Firm*—Sughrue, Mion, Zinn, Macpeak & Seas; Richard C. Turner; Marie-Claire Biosvert

[57] ABSTRACT

In an improved method and apparatus for processing image signals, an input original image signal that contains a periodic pattern is smoothed to obtain a first unsharpness signal which is then processed for sharpness to obtain an output image signal having its edge enhanced and this output image signal is halftoned to obtain a halftone image signal from which a halftone image is reproduced. The mask size used in the smoothing step is computed in accordance with the pitch of said periodic pattern as optionally combined with the factor of scaling for conversion from an input to an output image. Alternatively, said first unsharpness signal is processed for sharpness only when the difference between said first unsharpness signal and the second unsharpness signal which is obtained by smoothing it is greater than a predetermined threshold value. The apparatus is capable of reproducing a sharp image with minimum moiré even if the input original image contains a periodic pattern.

21 Claims, 10 Drawing Sheets

METHOD AND APPARATUS FOR PROCESSING IMAGE SIGNAL

This is a Continuation of application Ser. No. 07/779,319 filed Oct. 18, 1991 now abandoned.

BACKGROUND OF THE INVENTION

This invention relates to a method and apparatus for processing image signals and, more particularly, to a method and apparatus for processing image signals in such a manner that when the image information to be halftoned contains a regular or periodic pattern, the averaging mask size is first determined in accordance with the pitch of said regular or periodic pattern of its combination with the factor of scaling from an input to an output image and said image information is subsequently smoothed (processed for unsharpness) or, alternatively, said image information is first processed for unsharpness and then the portion of the resulting unsharpness signal which has experienced a large change is selectively processed for enhanced sharpness, thereby reproducing a sharp image free from a moiré pattern. Then, the averaging mask size is the mask size of averaging the image signals of the pixel of interest and the surrounding pixels for smoothing the image signal of interest.

Image scanning reading and reproducing systems are widely used in the printing and platemaking industries for electrically processing the image information on originals to produce original film plates with a view to simplifying the entire process and improving the quality of printed images.

The image scanning reading and reproducing system is composed basically of an image reading unit and an image recording unit. In the image reading unit, the image information on the original which is transported in an auxiliary scanning direction is scanned with a photosensor in a main scanning direction which is normal to the auxiliary scanning direction, whereby scanned image information is converted to an electric signal. The image information which has been subjected to photoelectric conversion in the image reading unit is then processed in a predetermined manner according to specified platemaking conditions. Thereafter, the processed image signal is converted to a signal of light such as a laser beam and recorded on an image recording medium of a photosensitive material such as a photographic film in the image recording unit. The image recording medium carrying the recorded image is subsequently developed with an image developing device and will be used as an original film plate for printing and other purposes.

In the image scanning reading and reproducing system of the type described above, a continuous-tone image is converted to a halftone image in order to reproduce its gradations. If the image of the original contains a regular or periodic pattern as in an already halftoned print, said regular or periodic pattern will interfere with the halftone dots in the output image in the subsequent halftoning process, thereby producing a moiré pattern in the resulting image.

One solution to the above problem is to adjust the angle of a halftoning screen in such a way as to minimize the generation of a moiré pattern. However, selecting an optimum screen angle is in itself a tedious and time-consuming task and requires skill on the part of the operator. Another proposal involves alteration of the aperture size of the halftone screen for blurring the image, so that any regular or periodic pattern contained in the image information will become less discernable. However, this method is disadvantageous in that the processed image is relatively unclear and hence poor in quality. In addition, the applicability of this method is considerably limited since it can be used only in the case where the aperture size is physically alterable.

Under these circumstances, the assignee previously proposed in U.S. patent application Ser. No. 543,525 (Jun. 26, 1990), now U.S. Pat. No. 5,065,255 a method and apparatus for processing image signals, in which the image information on an original is first processed for unsharpness by smoothing (averaging) and then processed for enhanced sharpness by sharpening so that a sharp image free from a moiré pattern can be reproduced not only from original images having no regular or periodic pattern but also from those having regular or periodic patterns. The proposed method is characterized by a smoothing step in which the image information is processed for unsharpness by averaging with reference to a given constant mask size. Since the mask size is so selected that it corresponds to a comparatively fine screen, the method is reasonably effective in preventing the generation of a moiré pattern if the original is of a common type which has a fairly small pitch of halftone dots. However, in such cases as where the halftone dots in the input original are coarse or where the smoothing step is preceded by exposure at an enlarged scale, the pitch of halftone dots in the input original is increased to become larger than the fixed mask size. If the mask size is smaller than the pitch of halftone dots in the input original, only insufficient smoothing is performed and the output halftone image contains a moiré pattern that degrades its quality.

In short, the method proposed by U.S. patent application Ser. No. 543,525 is practically ineffective if the original is either a print that carries an image of coarse halftone dots or a print that has a fairly small pitch of halftone dots but which is enlarged by a large scale so that a regular pattern of a long period of variations is superposed on the original image signal to be read. In such cases, the noise level of the original image signal may be reduced by processing for unsharpness (smoothing) but it cannot be completely removed and residual noise such as the above-mentioned regular pattern will inevitably occur. If the subsequent step of sharpening (processing for enhanced sharpness) is performed by an increased degree with a view to enhancing image sharpness, the residual noise is also sharpened and the periodic pattern once smoothed out will reemerge to enhance the moiré pattern produced by its interference with the halftone dots in the output image, thereby leading to deteriorated image quality.

SUMMARY OF THE INVENTION

The present invention has been achieved under these circumstances and has as an object providing a method and apparatus for processing image signals in such a way that even if the input original image contains a regular or periodic pattern, the moiré pattern generated by the interference between the pitch of that pattern and the pitch of halftone dots in the output image can be sufficiently reduced to produce a sharp image.

In its first aspect, the present invention attains the above-described object by a method for processing image signals that comprises the steps of smoothing image information containing a periodic pattern to obtain an unsharpness signal, sharpening the resulting unsharpness signal to obtain a sharpness signal and halftoning the resulting sharpness signal to form a halftone image signal, which method is characterized in that an averaging mask size is determined in accordance with a pitch of said periodic pattern in said image information and that the smoothing step is performed with reference to the thus determined mask size.

Preferably, said averaging mask size is computed in accordance with the pattern of said periodic pattern and the factor of scaling for conversion from an input to output image.

Preferably, said averaging mask size is within the range of from 0.8 to 1.2 times the product of the pitch of said periodic pattern and said factor of scaling.

Preferably, said averaging mask size is within the range of from 0.9 to 1.1 times the product of the pitch of said periodic pattern and said factor of scaling.

Preferably, said averaging mask size is equal to the pitch of said periodic pattern.

In its second aspect, the present invention provides a method for processing image signals that comprises the steps of:

smoothing a readout of original image information to obtain a first unsharpness signal;

smoothing said first unsharpness signal to obtain a second unsharpness signal;

determining the difference between said first unsharpness signal and said second unsharpness signal;

comparing said difference with a predetermined threshold value;

sharpening said first unsharpness signal to obtain an output image signal only when the absolute value of said difference is greater than said threshold value; and halftoning said output image signal.

Preferably, if the absolute value of said difference is equal to or smaller than said threshold value, said second unsharpness signal is directly delivered as an output image signal, which is then halftoned.

Preferably, the mask size used in said first smoothing step is variable.

Preferably, the mask size used in said second smoothing step is variable.

In its third aspect, the present invention provides an apparatus for processing image signals that comprises:

a first smoothing circuit that smoothes a readout of original image information to obtain a first unsharpness signal;

a second smoothing circuit that smoothes said first unsharpness signal to obtain a second unsharpness signal;

a differential circuit that determines the difference between said first and second unsharpness signals;

a comparator circuit that compares the absolute value of said difference with a predetermined threshold value;

a sharpening circuit that sharpens said first unsharpness signal to obtain an output image signal when the absolute value of said difference is greater than said threshold value;

a circuit that directly delivers said second unsharpness signal as said output image signal when the absolute value of said difference is equal to or smaller than said threshold value; and a halftoning circuit that halftones said output image signal.

DETAILED DESCRIPTION OF THE PREFERRED EMBODIMENTS

The preferred embodiments of the method and apparatus of the present invention for processing image signals are described below in detail with reference to the accompanying drawings.

Figure 1:
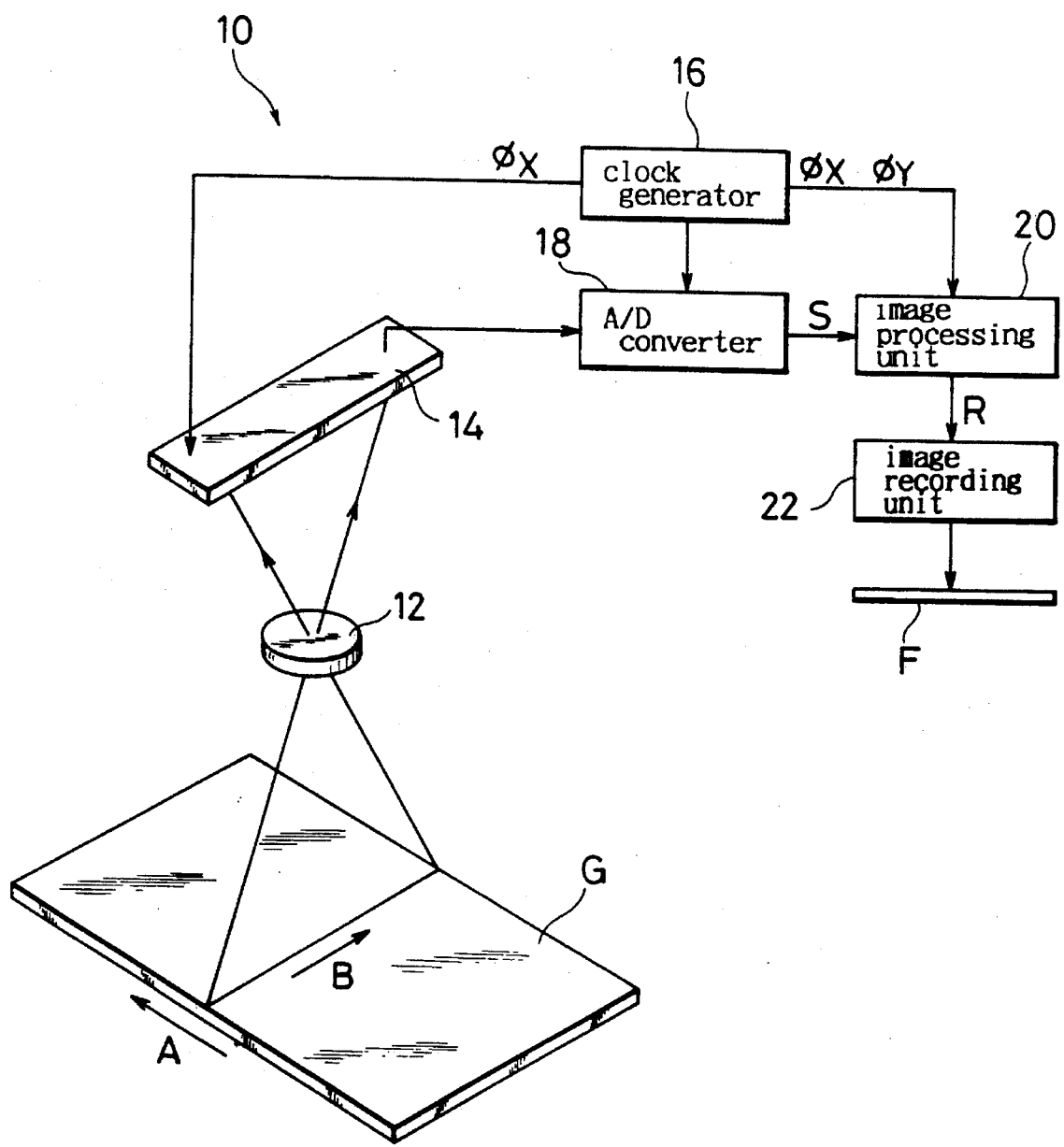
FIG. 1 is a schematic view, partly in block form, of an image reading and recording system which incorporates an image signal processor that will implement the image signal processing method of the present invention.

To begin with, the image signal processing method according to the first aspect of the present invention is described with reference to FIGS. 1–4. In FIG. 1, numeral 10 denotes an image reading and recording system which incorporates an image signal processor that will implement the image signal processing method of the first aspect. In the system 10, image information on an original G that contains a regular or periodic pattern (as in a halftone image on printed matter) is converted to an electric signal and thereafter reproduced as a halftone image on a film F. As shown, the original G is adapted to be transported in an auxiliary scanning direction of arrow A by a suitable transport means (not shown). The image information (e.g. halftone image) on the original G which contains a regular or periodic pattern is scanned in a main scanning direction of arrow B by a photoelectric transducer means CCD 14 with a light beam collected by an optical guide means 12. The image signal that has been subjected to photoelectric conversion by CCD 14 and that has been corrected for analog values such as gain is fed to an A/D converter 18 where it is converted to a digital image signal S in response to a main scanning clock signal $\phi_x$ from a clock generator 16. Thereafter, the image signal S is supplied into an image processing unit 20 composed of an apparatus that implements the image signal processing method of the present invention. In the image processing unit 20, the signal S is corrected for various parameters including the shading and darkness of CCD 14 and then subjected to various image processing steps including logarithmic conversion, gradation conversion, conversion of scaling factor, smoothing, sharpening and halftoning in response to the main scanning clock signal φx and an auxiliary scanning clock signal φy being supplied from the clock generator 16. The processed signal is delivered as a binarized halftone image signal R to an image recording unit 22. The image recording unit 22 converts the signal R to a signal of light such as a laser beam, which is guided onto the film F to record a halftone image.

Figure 2:
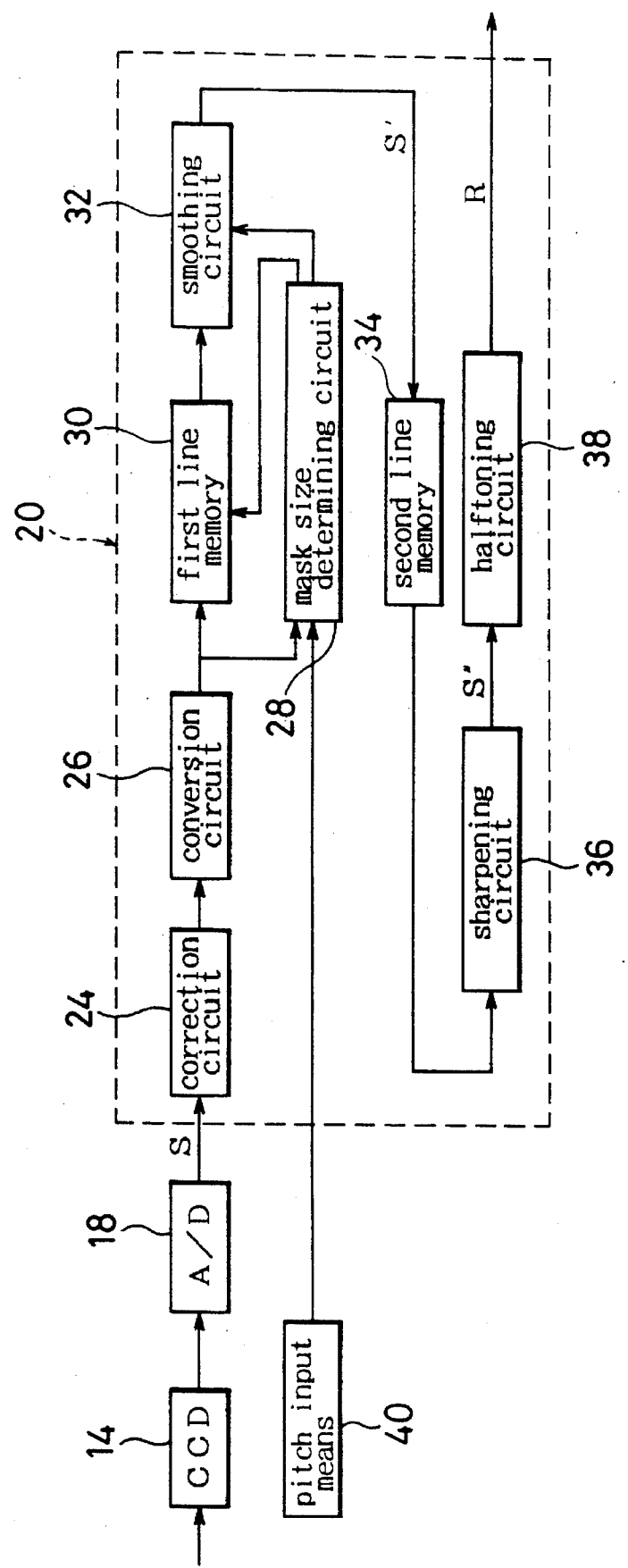
FIG. 2 is a block diagram showing and embodiment of the image signal processor that includes the image processing unit shown in FIG. 1.
Figure 3:
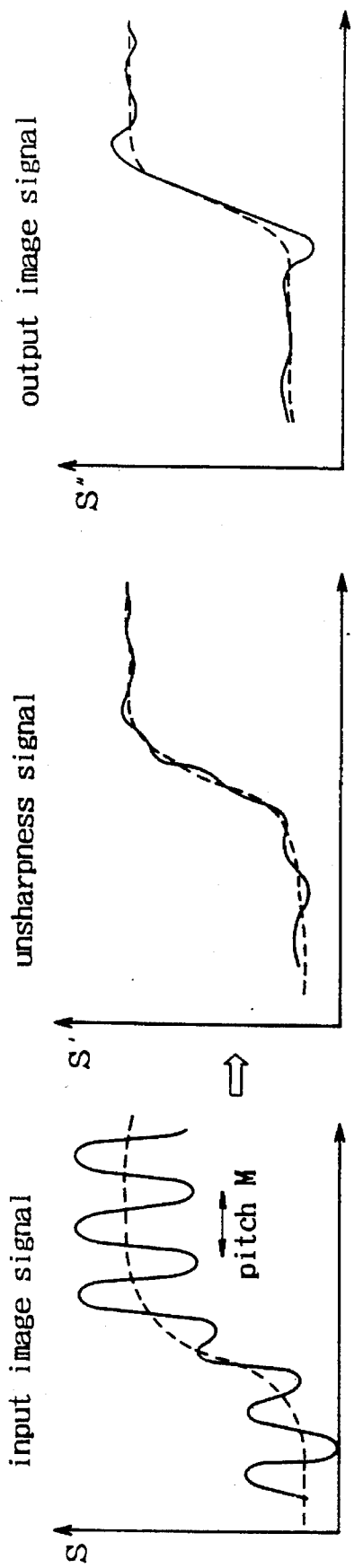
FIGS. 3a, 3b and 3c are graphs showing an example of the input image signal, unsharpness signal and sharpness signal (output image signal), respectively, that are to be handled by the image signal processing method of the present invention.

FIG. 2 is a block diagram showing an example of the first embodiment of the image signal processor that includes the image processing unit 20 shown in FIG. 1 and which implements an image signal processing method according to the first aspect of the present invention. As shown, the image processing unit 20 comprises a correction circuit 24, a conversion circuit 26, a mask size determining circuit 28, a first line memory circuit 30, a smoothing (unsharpness processing) circuit 32, a second line memory circuit 34, a sharpening (processing for enhanced sharpness) circuit 36 and a halftoning circuit 38.

The correcting circuit 24 performs various kinds of correction including "offset correction" by which the temperature drifts in the base of the image signal that has been A/D converted by the CCD 14 which is a solid-state imaging device are corrected for each line, correction of defective pixels in the CCD, "shading correction" for correcting the fluctuations in the amount of light reception (as well as in the light of illumination) due to variations among pixels of CCD 14, and "darkness correction" for correcting the fluctuations in base among pixels (that also occur in the absence of incident light). As a result of these corrections, the signals of light received by all pixels are rendered uniform in terms of base so that the same image signal (image data) is obtained if the density of the original image is equal. If desired, shading correction, darkness correction and other kinds of correction that are described above may be performed on analog data before the signal of light received by CCD 14 is A/D converted by the A/D converter 18. In the case shown in FIG. 2, the correction circuit 24 is provided downstream of the signal transmission from the A/D converter 18. If desired, the correcting circuit 24 may be connected at the stage subsequent to a logarithmic conversion circuit to be described just below, so that the CCD signal is first subjected to logarithmic conversion before various corrections are carried out.

The conversion circuit 26 is provided for converting the image signal to the necessary signal for image recording and comprises typically a logarithmic conversion circuit which performs logarithmic conversion on the image signal and a gradation conversion circuit which performs conversion to an image signal that matches given gradation characteristics (exposure vs density characteristics).

The mask size (M) determining circuit 28 obtains the pitch of the regular pattern in the input image signal S, determines the mask size (one dimensional mask size data) $M_1$ which is equal to that pitch, or the number of pixels $M_1$ used for smoothing in the smoothing circuit 32, and transfers the number of lines to be stored and the mask size data $M_1$ into the first line memory circuit 30 and the smoothing circuit 32, respectively.

In the first aspect of the present invention, the mask size $M_1$ is advantageously set to have the same pitch as that of the regular pattern, or halftone dots, in the input image signal S. Preferably, the pixels in the averaging mask are odd in number and arranged symmetrically with respect to a certain pixel. Therefore, the mask size $M_1$ need not be completely identical in pitch to the regular pattern in the input image signal S as long as there will be generated no discernible moiré pattern. In the embodiment under consideration, 150 lines, 100 lines and 65 lines as the pitch of halftone dots correspond to mask sizes 10 (10×10 pixels), 15 (15×15 pixels) and 25 (25×25 pixels), respectively. Advantageous examples of the averaging mask size $M_1$ are 10, 15 and 25.

The mask size determining circuit 28 may determine and alter the mask size $M_1$ by reading the pitch of the regular pattern in the input image signal on the basis of the image signal data. Alternatively, the same result can be attained by the operator who enters external input data by a pitch input means 40.

The first line memory circuit 30 comprises a plurality of line memories that are necessary for smoothing (processing for unsharpness) and serves to store $M_1$ lines of the image signal in accordance with the mask size data $M_1$ after it has been processed by the conversion circuit 26.

Suppose here that the image signal S obtains from the original G is divided into n×n pixels. Then, in accordance with the mask size $M_1$ data sent from the mask size determining circuit 28, the first line memory circuit 30 stores $M_1$ lines of image signal including the center line which contains a pixel of interest (i,j); namely, the memory circuit 30 stores L lines (L=($M_1$−1)/2) of image signal on either side of the pixel line i.

The image signal stored in the first line memory circuit 30 is processed for unsharpness in the smoothing circuit 32 with reference to the mask size $M_1$, to thereby obtain a smoothed image signal S'. Stated more specifically, the image signal $S_{ij}$ (i=1, ... n; j=1, ... n) stored in the first line memory circuit 30 is smoothed in the circuit 32 by being averaged in accordance with the mask size $M_1$ together with the surrounding image signals also stored in the memory circuit 30, whereby said image signal $S_{ij}$ is converted to a first unsharpness signal $S'_{ij}$ which is an electrically blurred image signal.

The first unsharpness signal $S'_{ij}$ is obtained by averaging not only the image signal $S_{ij}$ comprising a predetermined number of pixels that are specified by the mask size $M_1$ but also the surrounding image signals. If $M_1$ is assigned as the mask size data described above, namely, the number of pixels to be used in constructing the first unsharpness signal $S'_{ij}$ and if L is ($M_1$−1)/2 as already defined above, then $S'_{ij}$ can be determined by:

$$S'_{ij} = \sum_{k=i-L}^{i+L} \sum_{m=j-L}^{j+L} S_{km}/M_1^2 \qquad (1)$$

This, however, is not the sole case for smoothing to be performed in the first aspect under consideration and any smoothing method can be adopted as long as it is performed with reference to the mask size $M_1$.

In the first aspect under consideration, the smoothing circuit 32 performs smoothing with reference to the mask size $M_1$ that matches the pitch of the periodic pattern contained in the image signal S, or by using signals of $M_1 \times M_1$ pixels including the central pixel signal $S_{ij}$. Thus, even if the input image signal contains the frequency component of the regular or periodic pattern, namely, the variations of pitch $M_1$, as shown in FIG. 3a, the first unsharpness signal S' which is the smoothed signal has the frequency component rejected satisfactorily by smoothing as shown in FIG. 3b.

As in the case of the first line memory circuit 30, the second line memory circuit 34 comprises a plurality of line memories and serves to store the smoothed signal S' which is obtained in the smoothing circuit 32. Thus, the circuit 34 stores the first unsharpness signal $S'_{ij}$ for each fast scanning line.

The sharpening circuit 36 performs processing for sharpness by enhancing the edge such as the contour of the image.

In the first aspect under consideration, the sharpening circuit 36 performs processing for enhanced sharpness on the first unsharpness signal S' which has been satisfactorily freed of the frequency component of the regular or periodic pattern in the input image information. Therefore, the output image signal (sharpness signal) S" has an enhanced edge and is free from a moiré pattern as shown in FIG. 3c.

Stated more specifically, the sharpening circuit 36 performs processing for enhanced sharpness to construct an output image signal (sharpness signal) $S''_{ij}$. In the sharpening circuit 36, the smoothed image signals around the first unsharpness signal $S'_{ij}$ are averaged (smoothed) with reference to another predetermined mask $M_2$, whereby a second unsharpness signal $u_{ij}$ is constructed according to the following equation which is essentially the same as equation (1):

$$u_{ij} = \sum_{k=i-L}^{i+L} \sum_{m=j-L}^{j+L} S'_{km}/M_2^2 \qquad (2)$$

The mask size data $M_2$ is selected to insure optimum visual characteristics for providing enhanced sharpness. Subsequently, a signal is obtained that represents the difference between the first unsharpness signal $S'_{ij}$ and the second unsharpness signal $u_{ij}$. The difference signal is multiplied by a sharpness parameter K and the first unsharpness signal $S'_{ij}$ is added to the product, thereby producing an output image signal $S''_{ij}$ as defined by:

$$S''_{ij} = S'_{ij} + K(S'_{ij} - u_{ij}) \qquad (3)$$

In the process described above, the image signal $S_{ij}$ which contains a regular or periodic pattern has its frequency component smoothed and eliminated as a result of the generation of the first unsharpness signal $S'_{ij}$ in the unsharpness processing circuit 32. Hence, the sharpening circuit 36 performs processing for enhanced sharpness on the first unsharpness signal $S'_{ij}$ which is free from the frequency component of the unwanted regular pattern, whereby the resulting image signal $S''_{ij}$ has an enhanced edge and yet contains no moiré pattern.

If the image information carried on the original G represents an image that does not contain any regular or periodic pattern as typified by a photographic image, the unsharpness processing circuit 32 in the image processing unit 20 is inactivated so that said image information is only subjected to normal processing for enhanced sharpness in the sharpening circuit 36. For example, a constant multiple of the smoothed image signal S' is subtracted from the image signal S and unsharp masking is performed to increase the image sharpness and enhance its edge.

The halftoning circuit 38 constructs a halftone image signal R from the image density signal, which performs area modulation on the image density in accordance with a desired screen angle and the number of screen lines. Thus, in the halftoning circuit 38, the output image signal $S''_{ij}$ is converted to an on/off signal (i.e., halftone image signal R) of a desired dot size on the basis of a predetermined halftone information signal. The obtained halftone image signal R is delivered as an input to the image recording unit 22.

Each of the correcting circuit 24, the conversion circuit 26, the first and second line memory circuits 30 and 34, the sharpening circuit 36 and the halftoning circuit 38 may adopt any known circuit configuration.

Being constructed basically in the manner described above, the image reading and recording system which incorporates an image signal processor that implements the image signal processing method according to the first aspect of the present invention will operate as follows.

First, as shown in FIG. 1, a halftone image (image information containing a regular or periodic pattern) on the original G being transported in the auxiliary scanning direction of arrow A is scanned by CCD 14 in the main scanning direction of arrow B with light collected by the optical guide means 13, whereby said image is converted to an electric signal. Subsequently, the halftone image in the form of an electric signal is converted to a digital signal by the A/D converter 16 in response to a fast clock signal $\phi_x$ from the clock generator 16, whereby and image signal S ($S_{ij}$) is obtained. The image signal S ($S_{ij}$) is transmitted to the image processing unit 20 and, as shown in FIG. 2, it is fed to the correcting circuit 24 where it is corrected for offset, defective pixels in the CCD, shading and darkness; subsequently, the corrected image signal is fed to the conversion circuit 26 where it is subjected to various conversion processes including logarithmic conversion, gradation conversion and conversion of scaling factor. Thereafter, the image signal is transferred to the first line memory circuit 30 and stored there for each main scanning line. At the same time, the pitch of the regular pattern in the original G is entered by input means 40 or the pitch $M_1$ is read from the image signal. Hence, the mask size determining circuit 28 supplies the first line memory circuit 30 with mask size data $M_1$ which is equal to the pitch $M_1$, whereupon the first line memory circuit 30 stores $M_1$ lines of line data (image signal for one line).

In the smoothing circuit 32, the image signal $S_{ij}$ stored in the first line memory circuit 30 is smoothed by eq. (1) with reference to the mask size $M_1$ using the mask size data $M_1$ from the mask size determining circuit 28. As a result, the image signal $S_{ij}$ is converted to the first unsharpness signal $S'_{ij}$ from which the frequency component of the undesired regular pattern has been satisfactorily removed.

In the next step, $M_2$ lines ($M_2$ is another predetermined number) of the first unsharpness signal $S'_{ij}$ are stored in the second line memory circuit 34 for each main scanning line.

In the sharpening circuit 36, $M_2$ lines of the first unsharpness signal $S'_{ij}$ stored in the second line memory circuit 34 are averaged by eq. (2) with reference to the mask size $M_2$ so that they are converted to the second unsharpness signal $u_{ij}$. Thereafter, the second unsharpness signal $u_{ij}$ is subjected to unsharp masking by eq. (3) so as to produce an output image signal $S''_{ij}$ that has an enhanced edge and that is free from any moiré pattern.

The output image signal $S''_{ij}$ thus processed for enhanced sharpness is thereafter fed to the halftoning circuit 38, where it is converted to a pulse width modulated signal that has an optimum and precise correspondence to dot areas in accordance with the image density that will not generate any moiré pattern. The modulated signal is delivered as a halftone image signal R to the image recording unit 22.

For exposure at an enlarged or reduced scale, a scaling circuit that performs conversion to a pixel signal matching the pixel density in the main scanning direction may be provided in the image processing unit 20. In this case, the scaling circuit is preferably provided in the stage subsequent to the smoothing circuit 32 to insure that the pitch of the periodic pattern in the original G will not differ from the pitch of the periodic pattern in the image signal S to be smoothed.

Finally, the image recording unit 22 forms a moiré-free halftone image on the film F on the basis of the halftone image signal R.

In the first aspect under discussion, the smoothing step is performed with reference to the mask size $M_1$ which is equal to the pitch of the regular pattern in the original G, namely the pitch of variations $M_1$ (the inverse of frequency) that are superposed on the image signal S. Hence, even if the pitch of halftone dots in the input image signal is such that the pitch of the regular pattern in the original G is not in registry with the fixed averaging mask size, especially in the case where the pitch of the regular pattern is larger than the averaging mask size (the halftone dots are coarse), satisfactory smoothing is achieved to insure that the unsharpness signal S' is satisfactorily freed of the frequency component of the regular pattern in the original. Therefore, in the first aspect of the present invention, image sharpening can be performed using the fully smoothed signal which does not contain the frequency component of the regular pattern in the original and this enables a halftone image to be formed without producing a moiré pattern.

When a scaling factor conversion (or scaling) is effected prior to the smoothing step as in the second embodiment of the first aspect which is to be described just below, the averaging mask size must be altered in consideration of not only the pitch of the regular pattern in the original G but also the factor of scaling selected.

Figure 4:
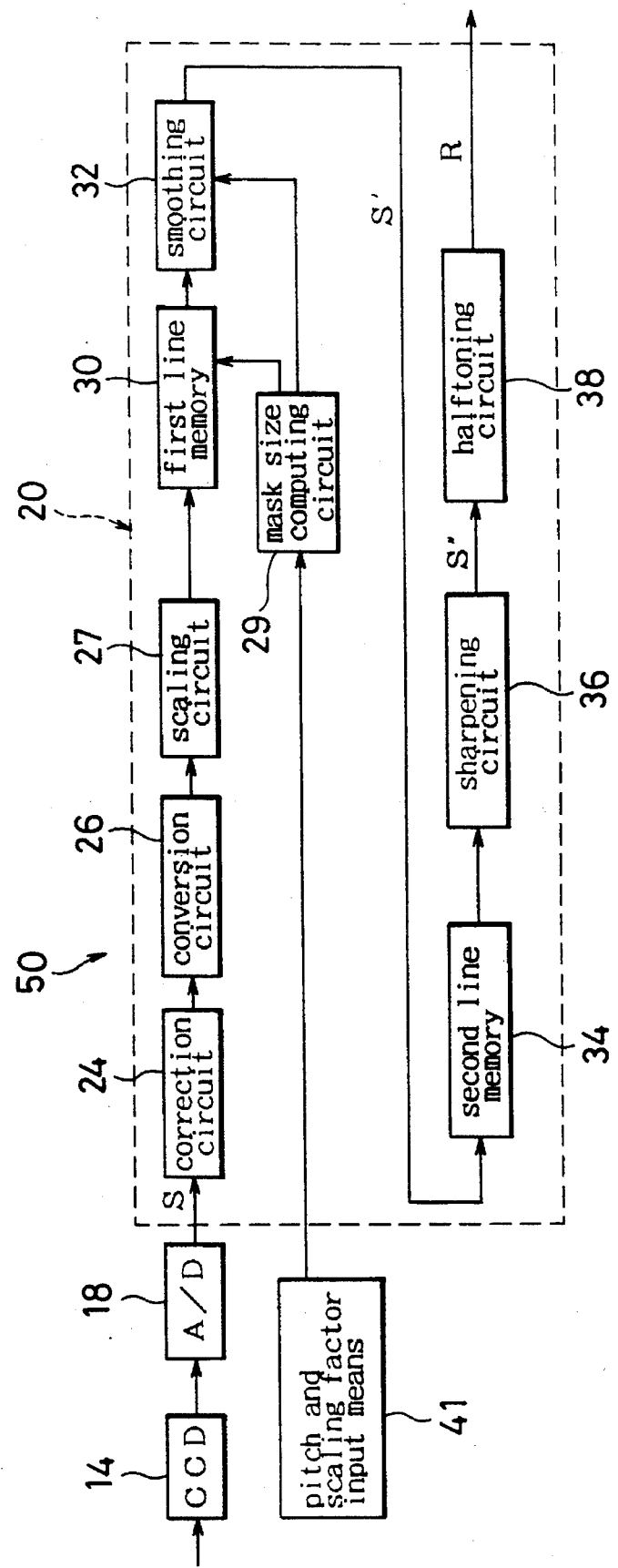
FIG. 4 is a block diagram showing another embodiment of the image signal processor that will implement the image signal processing method of the present invention.

FIG. 4 shows and image signal processor that will implement the image signal processing method according to the second embodiment of the first aspect of the present invention. The image signal processor generally indicated by 50 incorporates a modification of the image processing unit 20 shown in FIG. 1. The composition of the image signal processor 50 is essentially the same as that shown in FIG. 2 except that a scale factor converting circuit 27 is provided between the conversion circuit 26 and the first line memory circuit 30 and that a mask size computing circuit 29 and a data input unit 41 are substituted for the mask size determining circuit 28 and the pitch input entry means 40, respectively. Thus, those parts of the processor 50 which are identical to the parts of the processor shown in FIG. 2 are identified by like numerals and will not be described in detail.

In the scale factor converting circuit 27, the image signal that has been subjected to various conversion processes by the converter circuit 26 is further converted to an image signal that matches the pixel density in the main scanning direction in accordance with a given scale that is either enlarged or reduced depending upon the desired scale of exposure.

The data input unit 41 is used to enter both the pitch of the regular pattern in the original G, such as the pitch of halftone dots, and the factor of scaling from the original image to the recorded image (i.e., whether the original image is to be recorded at an enlarged, size-for-size, or reduced scale). In the embodiment under consideration, conversion of scaling factor can be effected over the range of from 20 to 200% even for color originals. The data entered by the input unit 41 are transmitted to the mask size computing circuit 29 in the image processing unit 20.

The mask size computing circuit 29 computes the mask size $M_1$ ($M_1$ is equal to the number of lines to be stored in the first line memory 30), or the number of pixels necessary for performing smoothing in the smoothing circuit 32 in a subsequent stage, and this computation is performed on the basis of the input data for the pitch of halftone dots in the input original image and the desired factor of scaling. The computed mask size $M_1$ is equal or substantially equal to the pitch of the regular pattern contained in the image signal $S_{ij}$ which has been subjected to a conversion of scaling factor and which is just about to enter the smoothing circuit 32.

The mask size $M_1$ to be used in the embodiment under consideration is advantageously determined in such a way that it is within the range of 0.8–1.2 times, preferably 0.9–1.1 times, the product of p and µ, where p is the pitch of the regular pattern in the original G and µ is the factor of scaling, as expressed below:

$$0.8 \leq M_1/(p * \mu) \leq 1.2 \quad (4)$$

or preferably $$0.9 \leq M_1/(p * \mu) \leq 1.1 \quad (5)$$

As already mentioned, odd numbers are usually selected for the mask size $M_1$, so the mask size that can be adopted in the present invention may be exemplified by, but not limited to, 3, 5, 7, 9, 11, 13, 15, 17, 19, 21 and 25. Even for size-for-size recording, the mask size $M_1$ may be determined by the image signal processor 50 of FIG. 4 on the basis of formula (4) or (5).

In the second embodiment of the first aspect of the present invention, the mask size $M_1$ is determined by the computation outlined above but the other processes including smoothing are performed in the same manner as described with reference to FIGS. 1 and 2 and hence will not be described in detail.

If the mask size M increases, the number of pixels (M×M) that are necessary for averaging (smoothing) will also increase, leading to the increase in the number of lines to be stored in the first and second line memory circuits 30 and 34. It therefore becomes necessary to increase the capacity of memories in the line memory circuits 30 and 34 but, in practice, the memory capacity cannot be increased without limits for economic reasons.

Under these circumstances, if the mask size $M_1$ exceeds a maximum value of the memory capacity of the line memory circuit 30, averaging for smoothing is preferably performed after subsampling parts of the data (image signal). Suppose, for example, the case where the line memory circuit 30 has a memory buffer capacity of 13 lines. In order to perform averaging with reference to a mask size of 25, either one of the following methods may be adopted:

a) use a subsampling rate of 2 and a buffer capacity of 13; or b) use a subsampling rate of 3 and a buffer capacity of 9.

The following table lists the sampling rates and the values of buffer capacity that can be used for mask sizes of 17, 19, 21 and 25 in the case where the maximum memory capacity is 13 lines.

| Mask size | Subsampling rate | Buffer capacity |
|---|---|---|
| 25 | 2 | 13 |
| 21 | 2 | 11 |
| 19 | 3 | 7 |
| 17 | 2 | 9 |

Consider, for example, the case of the mask size 17. If the image signal for the pixel of interest is $S_{ij}$, the line memory circuit 30 stores image signals for lines i−8, i−6, i−4, i−2, i, i+2, i+4, i+6 and i+8, and the first unsharpness signal $S'_{ij}$ is expressed by:

$$S'_{ij} = \sum_{k=-4}^{4} \sum_{m=-4}^{4} S_{i-2k,j-2m}/9^2$$

On the basis of this signal, the output image signal $S''_{ij}$ can be determined by eqs. (2) and (3).

The above-described technique is effective for saving on the memory capacity.

The image reading and recording system shown in FIG. 1 may sometimes have the need to allow CCD 14 to read an original G that carries image information of a type that contains a regular pattern as in an already halftones image. If such image information is further halftoned, a moiré pattern can potentially be generated in the image that is reproduced on the film F in the image recording unit 22.

To avoid this problem, the image signal obtained from the original G containing the regular pattern is first smoothed and then processed for sharpness so that the undesired regular pattern will become less discernible. However, if the regular pattern in the original G is coarse or if the pitch of the regular pattern in the image signal S to be smoothed is greater than the mask size $M_1$ as in the case of exposure on an enlarged scale, smoothing of the image signal can sometimes fail to eliminate the frequency component of the regular pattern and a moiré pattern may be generated in the output image.

However, in the first and second embodiments of the first aspect of the present invention, the pitch of the regular pattern in the image signal S to be smoothed is a adjusted to be equal or substantially equal to the mask size $M_1$, so the image signal can be effectively smoothed to eliminate the frequency component of the regular pattern involved. Hence, the smoothed image signal may be subsequently processed for sharpness and halftoned without producing a moiré pattern in the resulting final image.

As described above in detail, in accordance with the first aspect of the present invention, image information that contains a regular or periodic pattern is smoothed in such a way that the averaging mask size is determined in accordance with the pitch of said regular pattern or its combination with the factor of scaling for conversion from the input to output image signal, and the pitch of the regular pattern in the image signal to be smoothed is adjusted to be equal or substantially equal to the mask size. As a result, the image information signal of interest can be effectively smoothed to insure that the frequency component of the unwanted regular pattern superposed on said image signal can be satisfactorily eliminated.

Therefore, the smoothed unsharpness signal can be subsequently processed for sharpness and subjected to a desired halftone process for obtaining a halftone image signal and it can be reproduced as a halftone image without causing any moiré pattern.

In short, the present invention enables the production of high-quality original film plates for printing and platemaking applications from image information that contains a regular or periodic pattern.

On the pages that follow, an image signal processing method according to the second aspect of the present invention and an image signal processing apparatus according to its third aspect are described in detail with reference to FIG. 1 and FIGS. 5–10.

Figure 5:
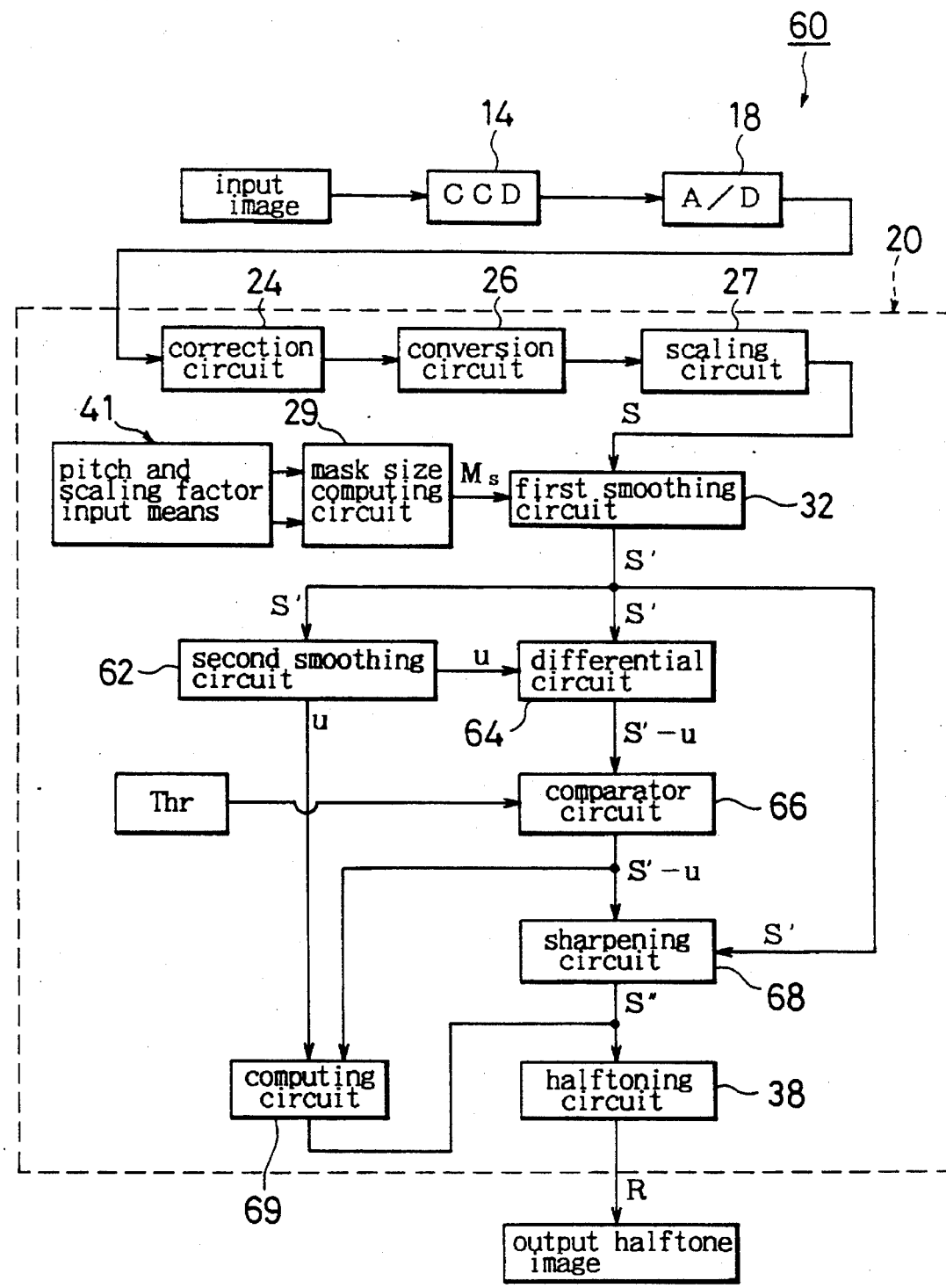
FIG. 5 is a block diagram showing an embodiment of the image signal processing apparatus of the present invention.

FIG. 5 is a block diagram of a first embodiment of the image signal processing apparatus according to the third aspect of the present invention for implementing the image signal processing method according to the second aspect of the present invention. The image signal processing apparatus generally indicated by 60 in FIG. 5 incorporates the image processing unit 20 in the image reading and recording system 10 shown in FIG. 1. Although the first and second line memory circuits 30 and 34 are not shown in FIG. 5, the image signal processing apparatus 60 is essentially the same as the image signal processor 50 of FIG. 4 except that the sharpening circuit 36 is replaced by a sharpening circuit 68 that has a different function and configuration. Hence, those parts of the apparatus 60 which are identical to the parts of the apparatus 50 are identified by like numerals and will not be described in detail.

As shown, the image signal processing apparatus 60 comprises a CCD correcting circuit 24, a conversion circuit 26, a scaling circuit 27, a means 41 for entering data on the pitch of the regular pattern in an input image and the factor of scaling that image, a mask size computing circuit 29, a first smoothing circuit 32 (for the first unsharpness processing), a second smoothing circuit 62 (for the second unsharpness processing), a differential circuit 64, a comparator circuit 66, a sharpening circuit 68 (for enhanced sharpness), a computing circuit 69 and a halftoning circuit 38.

The first smoothing circuit 32 used in the apparatus of the third aspect under consideration is such that an image signal S stored in a plurality of line memories (not shown) as already described in connection with the first aspect is smoothed with reference to the mask size (two dimensional mask size) $Ms_1$ determined by the mask size computing circuit 29, namely, the image signal for $Ms_1$ pixels consisting of the pixel of interest and the surrounding pixels is smoothed by being averaged to obtain a first unsharpness signal (smoothed signal) S'. The second averaging circuit 62 is such that the first unsharpness signal S' stored in a plurality of line memories (also not shown) is smoothed by being averaged to obtain a second unsharpness signal (second unsharpness signal) u. The mask $M_2$ (one dimensional mask size) used for the second smoothing is of a size that is so determined as to provide optimal results in the subsequent processing for sharpness. The size of the mask $M_2$ ($M_2 \times M_2$) may be fixed or variable with the halftone dot size of the input image or the averaging mask size $Ms_1$.

The differential circuit 64 computes S'–u, or the difference between the first unsharpness signal S' and the second unsharpness signal u.

The comparator circuit 66 compares |S'–u| (the absolute value of the difference computed by the differential circuit 64) with a preset threshold value Thr and activates the sharpening circuit 68 if |S'–u|>Thr but does not activate said circuit of |S'–u|≦Thr.

The sharpening circuit 68 enhances the edge such as the contour of an image and processes it for sharpness to obtain a sharpness signal, or an output image signal S". To this end, the second unsharpness signal u is subtracted from the smoothed signal S' and the difference is multiplied by a constant; the first unsharpness signal S' is added to the product, followed by unsharpness masking (USM) to increase the sharpness of the image and enhance its edge. It should, however, be noted that USM is not the sole technique of processing for sharpness and any other known sharpening techniques including the one to be described below may be employed.

The computing circuit 69 produces the yet to be sharpened first or second unsharpness signal S' or u directly as the output image signal S".

As shown in FIG. 5, the image signal S transmitted to the image processing unit 20 is corrected for shading and darkness in the CCD correcting circuit 24, subjected to logarithmic conversion and gradation conversion in the conversion circuit 26, then scaled in the scaling circuit 27 before it is fed into the first smoothing circuit 32.

Figure 6:
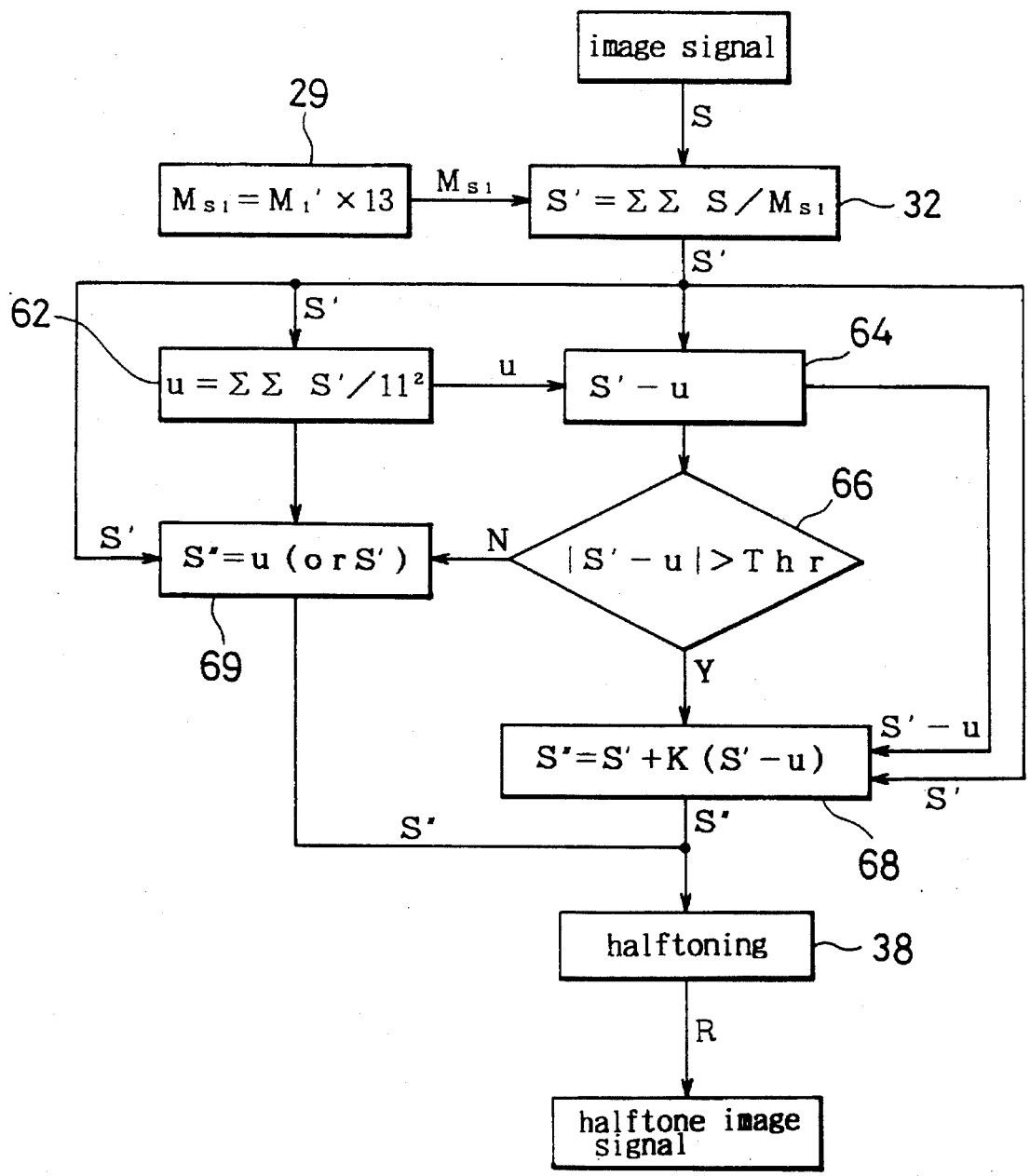
FIG. 6 is a flowchart for the image signal processing method of the present invention.

The image signal S is then subjected to various kinds of processing in the circuits at subsequent stages that are shown in FIGS. 5 and 6 and the processed image signal is halftoned in the halftoning circuit 38.

Suppose here the case where the image information that is carried on the original G to be read by CCD 14 contains a regular or periodic pattern as in an already halftoned image. One may attempt to render said regular pattern less discernible and enhance the image sharpness by first processing the obtained image signal for unsharpness and then processing it for sharpness by unsharp masking. However, if the frequency component of the regular pattern that remains after the processing for unsharpness exceeds a certain level, this frequency component will also be enhanced in sharpness by the subsequent processing for sharpness. Therefore, if the output image signal is halftoned in the next stage, a moiré pattern can potentially be generated in the image that is reproduced on the film F in the image recording unit 22, whereby the sharpness of the image is lowered to deteriorate its quality.

Therefore, in the second and third aspects of the present invention under consideration, selection is made as to whether the first unsharpness signal should be subjected to processing for sharpness depending upon the level of the regular pattern that is superposed as noise on said first unsharpness signal. By so doing, only the portion of the first unsharpness signal that contains changes in image density can be subjected to edge enhancement so as to reproduce an image that is free from any deterioration in quality due to moiré pattern and lower sharpness.

Figure 7A:
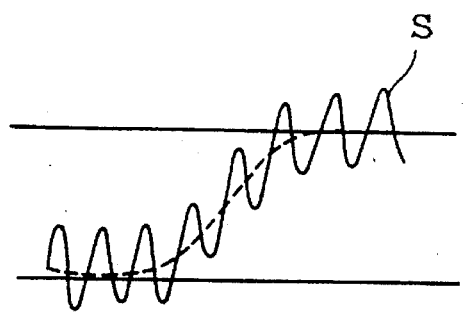
FIGS. 7a, 7b, 7c and 7d are graphs showing an example of the input image signal, first unsharpness signal, differential signal and output image signal, respectively, that are to be handled by the method of the present invention.
Figure 7B:
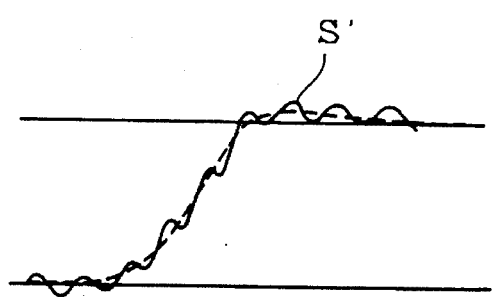

Stated more specifically, the image signal S obtained from the original G is assumed to be dividable into n×n pixels. Then, the image signal $S_{ij}$ (i=1, ... n; j=1, ... n) stored in the line memory and that is shown in FIG. 7a is processed in the first smoothing circuit 32 to be converted to a first unsharpness signal (smoothed signal S') $S'_{ij}$ that is an electrically blurred signal as shown in FIG. 7b. The first unsharpness signal $S'_{ij}$ is obtained by averaging the image signals around the image signal $S_{ij}$ and may be given by:

$$S'_{ij} = \sum_{k=i-p}^{i+p} \sum_{m=j-q}^{j+q} S_{km}/Ms_1 \quad (6)$$

In eq. (6), $Ms_1$ is mask size data, or the number of pixels to be averaged, and is given by $Ms_1=M'_1 * M'_2$, where $M'_1$ and $M'_2$ refer to the mask size data in two directions (row and column) that are predetermined by computation with the mask size computing circuit 29 in accordance with the pitch of the regular pattern (e.g. halftone dots) in the input original image and the factor of scaling for conversion from input to output image, respectively, that are entered by the data input means 41. In other words, $M'_1$ and $M'_2$ represent the number of pixels in two directions (row and column) used to generate the first unsharpness signal $S'_{ij}$. If the pitch of halftone dots in the input image is large, the mask size $Ms_1$ (or $M'_1$ and $M'_2$) is preferably increased accordingly, and vice versa. Symbols p and q in eq. (6) represent the values that are defined by $p=(M'_1-1)/2$ and $q=(M'_2-1)/2$, respectively.

Mask size data $M'_1$ may be the same or different from $M'_2$. Both $M'_1$ and $M'_2$ may be computed by the mask size computing circuit 30 or, alternatively, only one of them may be variable while the other is fixed. For example, FIG. 6 shows the case where $M'_1$ is variable for 1, 2, 3 ... and $M'_2$ is fixed for 13.

In the second and third aspects of the present invention under consideration, the mask size computing circuit 29 may be omitted so that both $M'_1$ and $M'_2$ are fixed to provide a fixed mask. However, in order to maximize the effectiveness of the present invention in reducing moiré generation, the mask size $Ms_1$ is preferably adjusted to an optimal value by means of the computing circuit 29.

In the next step, the first unsharpness signal $S'_{ij}$ is stored in the line memory at the later stage (not shown) for each main scanning line. Then, the first unsharpness signal $S'_{ij}$ and the surrounding image signals are simply averaged in the second smoothing circuit 62 by the following equation (7) so that it is converted to a second unsharpness signal (smoothed signal u) $u_{ij}$:

$$u_{ij} = \sum_{k=i-L}^{i+L} \sum_{m=j-L}^{j+L} S'_{km}/M_2^2 \quad (7)$$

where $M_2$ is separately determined mask size data and L is a parameter defined by $(M_2-1)/2$. In eq. (7), $M_2$ is a two-dimensional matrix consisting of pixels that are equal in number in the two directions (row and column). The mask size data $M_2$ may be fixed and a fixed mask for 11×11 is used in the case shown in FIG. 6. The number of pixels in $M_2$ may be different in the two directions or, alternatively, the number of pixels in one or two directions may be variable.

If the mask size $Ms_1$ used in the first smoothing step is small, that is, if the pitch of the periodic pattern, say halftone dots, in an input image, whether it is of a color or monochromatic original, is fine (e.g. the screen is finer than 150 lines), the mask size $M_2$ used in the second smoothing step may be of the size that is used in processing for normal sharpness. Hence, even if the mask size $M_2$ is as small as the 11×11 mask size shown in FIG. 8a, enhancement of the input image signal by unsharp masking in a subsequent stage is sufficient to achieve satisfactory results for enhanced sharpness without producing a moiré pattern.

Figure 8A:
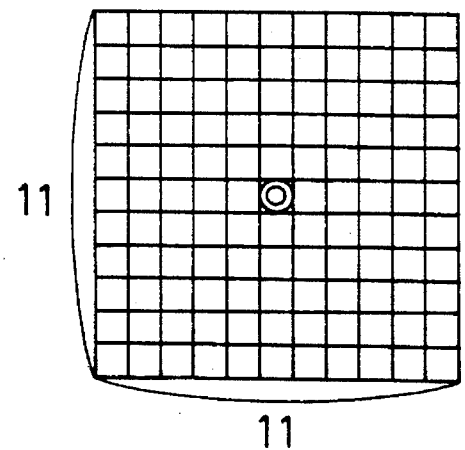
FIGS. 8a and 8b are diagrammatic views showing an example of the averaging masks that are used in processing for normal sharpness and in processing for hard sharpness, respectively.
Figure 8B:
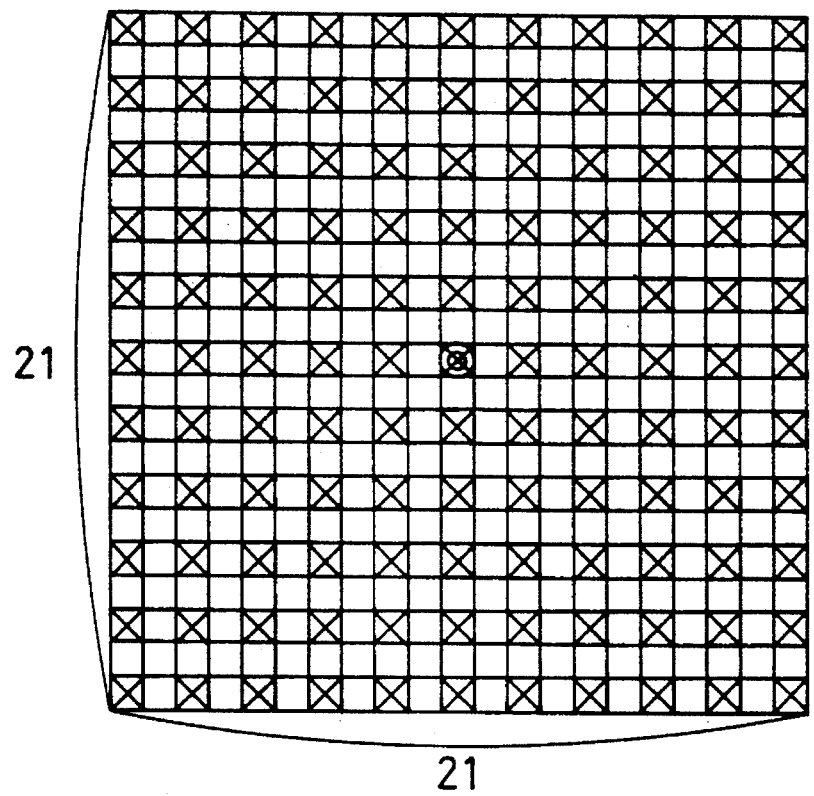

If, on the other hand, the pitch of the regular pattern (i.e., halftone dots) in the input image is coarse while the first averaging mask size $Ms_1$ is large (e.g. the screen is coarser than 133 lines), an increased amount of image will become blurred by averaging for smoothing and satisfactory results for enhanced sharpness cannot be achieved even if the input image signal is enhanced by unsharp masking. To solve this problem, the second averaging mask size $M_2$ for enhancement by unsharp masking must be increased but, then, an increase in the mask size $M_2$ will necessitate the use of a memory buffer of a larger capacity. This is clear from a comparison between FIG. 8a and FIG. 8b. FIG. 8a shows the second averaging mask size $M_2$ which consists of 5 pixels that are arranged in all directions to surround the pixel of interest (marked with ⊚) to construct an 11×11 mask. FIG. 8b shows a mask size which consists of 10 pixels that are arranged in all directions to surround the pixel of interest (marked with ⊚) to construct a 21×21 mask. If the mask size shown in FIG. 8b is used in place of the mask size shown in FIG. 8a, the necessary memory capacity is increased by a factor of ca. 3.6. To deal with this problem, subsampling is used as part of the smoothing step to be carried in the second and third aspects of the present invention under consideration. To take the 21×21 mask size of FIG. 8b as an example, only the pixels marked with X are averaged with a subsampling rate of 2; in other words, pixels are selected at every other line of 21 lines and averaged. This method is generally referred to as "processing for hard sharpness" and by using it, the number of pixels that have to be averaged is reduced to 11×11, which is equal to the number of pixels in the mask size 11×11 and the memory buffer that is used for the latter mask size can be applied without increasing its capacity.

In short, in the second and third aspects of the present invention under consideration, processing for "normal" sharpness is performed by averaging with the ordinary mask size if the pitch of the periodic pattern, say, halftone dots, in an input image is small (e.g. the screen is finer than 150 lines). If the pitch of the periodic pattern is coarse (the number of screen lines is small), the pixels are subsamples at a predetermined rate but the capacity of the buffer memory is left unchanged so that the mask on the output screen, namely, the mask for averaging is enlarged to a desired size and smoothing for unsharp masking is processed by averaging with the mask. This permits the image to be enhanced in sharpness more effectively than when it is subjected to processing for normal sharpness. Therefore, in the present invention, moiré generation can be avoided and image sharpness can be improved even if the screen is coarse as in the case where it consists of less than 133 lines (e.g. 100, 85 and 65). The improvement in sharpness is particularly great if the screen is coarser than 133 lines but finer than 100 lines.

The averaging mask size to be used in the processing for normal sharpness is in no way limited to the 11×11 size and it may be determined as appropriate in accordance with the required pitch of halftone dots in the output or the capacity of the memory buffer used. In addition, the averaging mask size to be used in the processing for hard sharpness also is not limited to the 21×21 size and it may be determined as appropriate in accordance with the desired pitch of halftone dots in the output in consideration of the required subsampling rate that is to be combined with a selected buffer memory capacity. Whether the input image signal should be processed for hard sharpness may be determined either manually by the operator who enters the necessary instruction on a keyboard or automatically in accordance with the first averaging mask size $Ms_1$ computed by the mask size computing circuit 29.

Figure 7C:
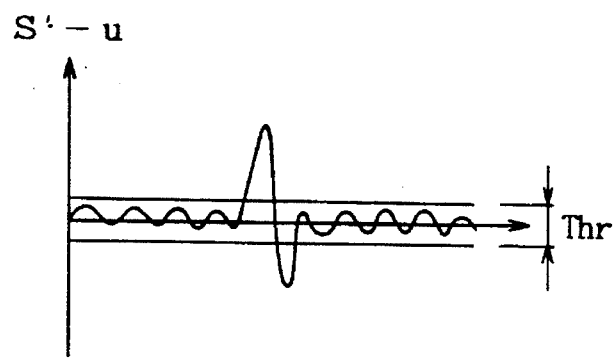

Both the first and second unsharpness signals $S'_{ij}$ and $u_{ij}$ are fed into the differential circuit 64 as shown in FIG. 7c to obtain the difference $S'_{ij}-u_{ij}$. Subsequently, the absolute value of the the difference, $|S'_{ij}-u_{ij}|$, is compared in the comparator circuit 66 with a predetermined threshold value Thr. If $|S'_{ij}-u_{ij}|$ is greater than Thr (i.e., the contrast is greater than the predetermined threshold value), the sharpening circuit 68 is activated to perform processing for sharpness. If $|S'_{ij}-u_{ij}|$ is equal to or smaller than Thr (i.e., the contrast is equal to or smaller than the predetermined threshold value), the computing circuit 69 is activated and no processing for sharpness is performed. In other words, if the original image signal $S_{ij}$ contains a regular pattern as noise, it is necessary that only the high-contrast portion of the image, namely, the change, such as density change, in the original image signal $S_{ij}$, be sharpened but without sharpening the noise that has been reduced to a lower level by the smoothing steps. To meet this need, the threshold Thr may be set at any appropriate value that is greater than the absolute value of the noise component (the frequency component of the regular pattern) in the first unsharpness signal but which is smaller than the change (differential value) of the first unsharpness signal due to the change in the density of the original image, as shown in FIG. 7c.

In the sharpening circuit 68, the first unsharpness signal $S'_{ij}$ is sharpened by unsharp masking (USM) to obtain a sharpness signal only when the absolute value $|S'_{ij}-u_{ij}|$ is greater than Thr. For USM, the difference $S'_{ij}-u_{ij}$ is multiplied by a sharpness parameter K and the first unsharpness signal $S'_{ij}$ is added to the product so as to obtain the output image signal $S''_{ij}$ which is defined by:

$$S''_{ij}=S'_{ij}+K(S'_{ij}-u_{ij}) \qquad (8)$$

When $|S'_{ij}-u_{ij}|\leq$Thr, the first unsharpness signal $S'_{ij}$ is not subjected to processing for sharpness and, instead, the computing circuit 69 produces either the first unsharpness signal $S'_{ij}$ or the second unsharpness signal $u_{ij}$ directly as the output image signal $S''_{ij}$.

Figure 7D:
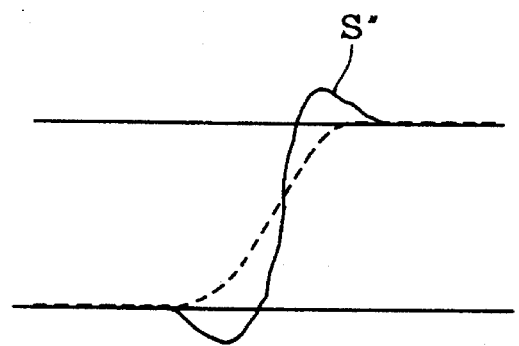

Therefore, by combining the outputs from the sharpening circuit 68 and the computing circuit 69, and output image signal $S''_{ij}$ can be obtained which, as shown in FIG. 7d, is free from any enhanced moiré signal but which is enhanced only in the edge portion, or the area such as a density changing area where a true change in the image signal S occurs. Yet, the output image signal $S''_{ij}$ has any undesired regular pattern and other noise components smoothed out to a satisfactory extent and, hence, is suitable for reproducing a sharp image in the absence of any moiré pattern. The effectiveness of the present invention in suppressing the moiré is particularly great if the second unsharpness signal $u_{ij}$ is produced as the output image signal $S''_{ij}$.

The thus obtained output image signal $S''$ is fed to the halftoning circuit 38 for printing, where it is converted to a pulse width modulated signal (on/off signal) that has an optimum and precise correspondence to dot areas in accordance with the desired image density. The modulated signal is delivered to the image recording unit 22 as a sharp halftone image signal R that contains no moiré signal.

Finally, the image recording unit 22 forms a moiré-free and sharp halftone image on the film F on the basis of the halftone image signal R.

If the image information carried on the original G is for an image that does not contain a regular or periodic pattern as in the case of a photographic original and if the readout of image information contains no noise, the first smoothing circuit 32 in the image processing unit 20 may be left inactive so that the readout information is directly averaged by the second smoothing circuit 62 and thereafter processed for enhanced sharpness by ordinary unsharp masking in the sharpening circuit 68.

The image signal processing method according to the second aspect of the present invention and the image signal processing apparatus according to the third aspect have the basic compositions that are described above. In order to achieve better results in terms of moiré suppression and image sharpness, the processing of the smoothed signal for sharpness by unsharp masking may be replaced by sharpening the two-stage technique illustrated in FIG. 9, in which the first unsharpness signal S' is first processed for sharpness in the manner to described below, to thereby obtain a first sharpness signal S* which is then used in combination with the second unsharpness signal u to perform processing for sharpness by unsharp masking so as to obtain an output image signal.

Figure 9:
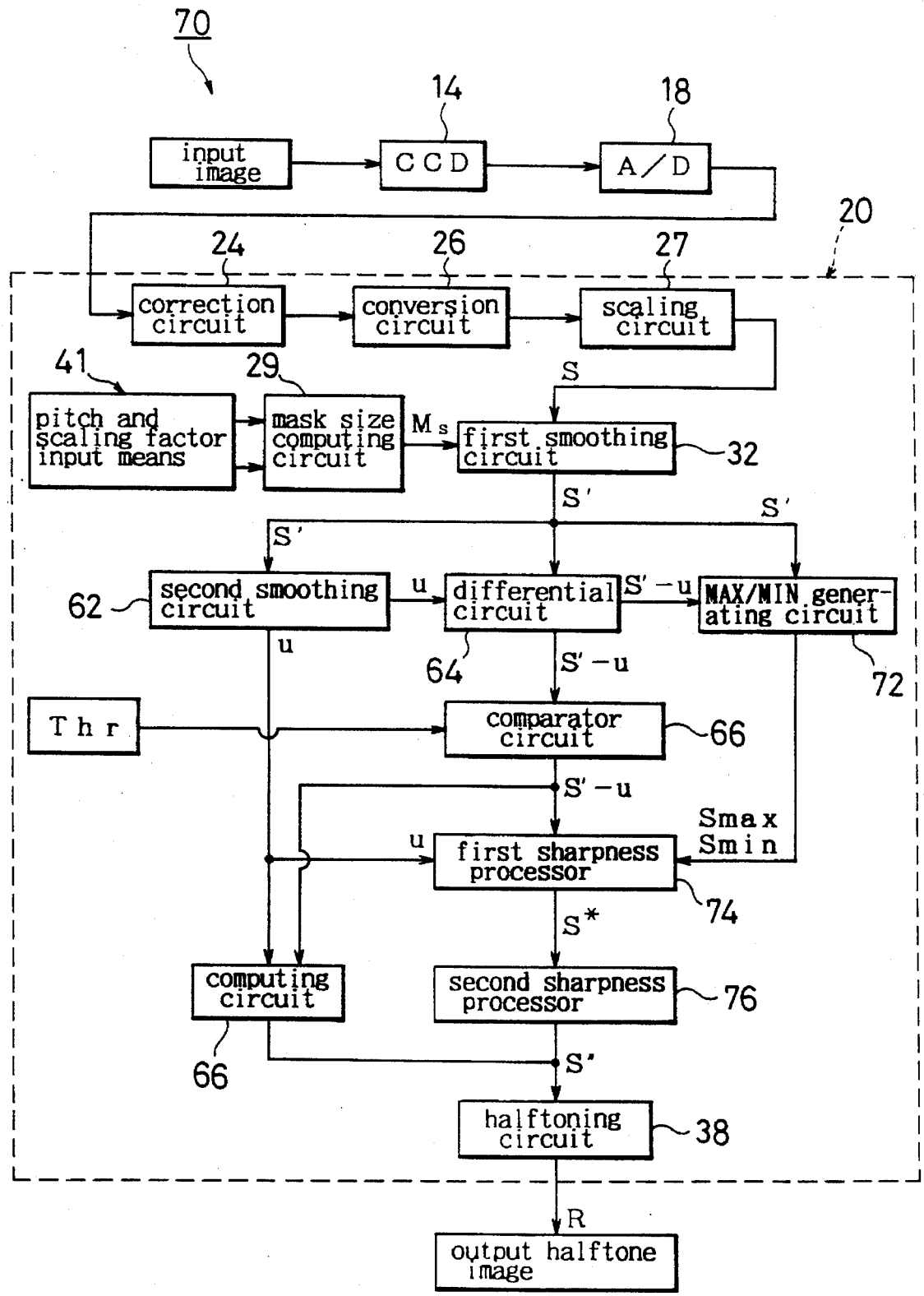
FIG. 9 is a block diagram showing another embodiment of the image signal processing apparatus of the present invention.

The image signal processor generally indicated by 70 in FIG. 9 is essentially the same as the image signal processor of FIG. 5 except for a max/min generator circuit 72, as well as a first and a second sharpening circuit 74 and 76. Those parts of the processor 70 which are identical to those shown in FIG. 5 are identified by like numerals and will not be described in detail.

The max/min generator circuit 72 converts the value of an image signal for a particular pixel to a maximum and a minimum value of image signals for the pixels within a predetermined range including that particular pixel. Stated more specifically, a maximum value conversion signal $S_{maxij}$ for the particular pixel (i, j) is assigned the greatest value of first averaged image signal $S'_{km}$ (e.g. k=i−L to i+L; m=j−L to j+L; L=(M−1)/2) for the pixels in the mask size M. Similarly, the minimum value conversion signal $S_{minij}$ is assigned the smallest value of first unsharpness image signal $S'_{km}$ (e.g. k=i−L to i+L; m=j−L to j+L).

Figure 10A:
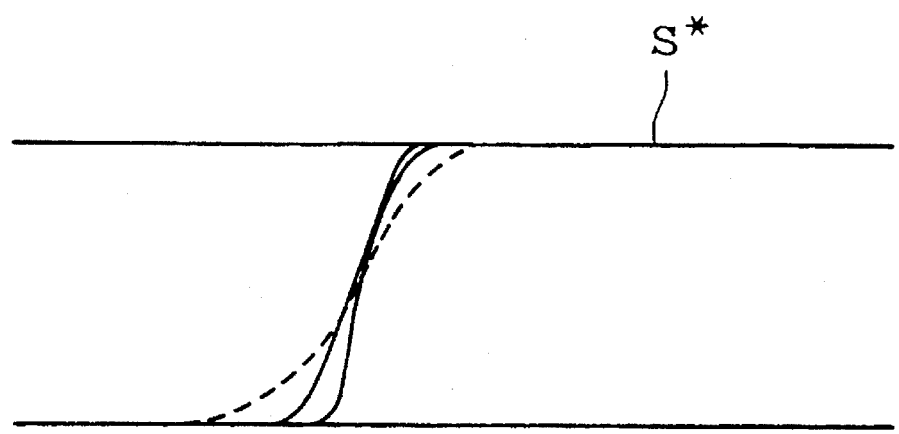
FIGS. 10a and 10b are graphs showing another example of the first sharpness signal and output image signal, respectively, that are to be handled by the method of the present invention.

In the embodiments under consideration, processing for sharpness is performed if $|S'_{ij}-u_{ij}|$, or the absolute value of the difference between the first unsharpness signal $S'_{ij}$ and the second unsharpness signal $u_{ij}$, is greater than the predetermined threshold Thr. If the difference is positive ($S'_{ij}-$ $u_{ij}>0$), the image signal curve is convex upwards, so the first sharpness signal $S_{maxij}$ is assigned in the first sharpening circuit 74. Conversely, if the difference is negative ($S'_{ij}-u_{ij}<0$), the image signal curve is convex downwards, so $S_{minij}$ is assigned as the first sharpness signal $S^*_{ij}$. In this way, an image signal with an enhanced edge, namely, the first sharpness signal $S^*_{ij}$, can be obtained as shown in FIG. 10a. This procedure may be referred to as the "S-substituted processing for sharpness".

In the next step, the second sharpening circuit 76 performs the second processing for sharpness by unsharp masking (see eq. (9) below) using a sharpness parameter K:

$$S''_{ij}=S^*_{ij}+K(S^*_{ij}-u_{ij}) \qquad (9)$$

Figure 10B:
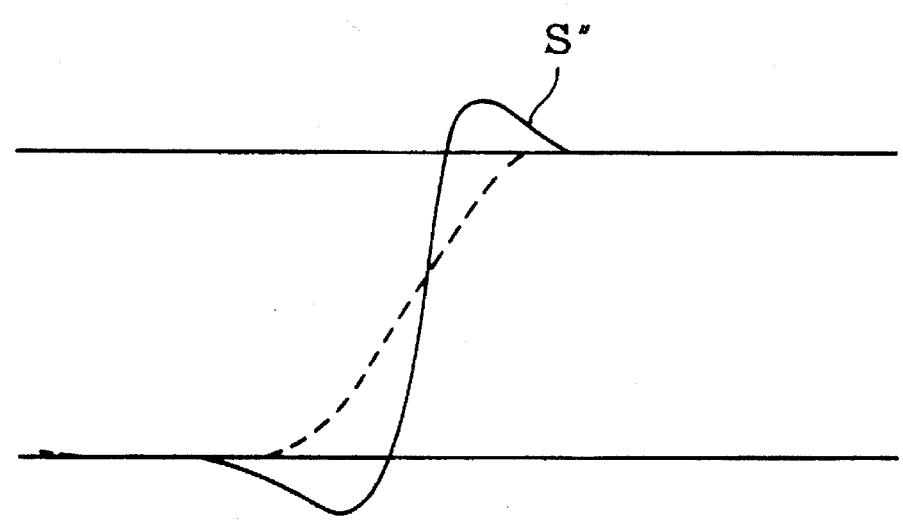

In the two-stage precessing for sharpness described above, the procedure for the case where $|S'_{ij}-u_{ij}|\leq Thr$ is the same as when the one-stage processing for sharpness is performed. That is, an output image signal $S''(S''_{ij})$ as shown in FIG. 10b is obtained by using the following equation (10) or (11):

$$S''_{ij}=S'_{ij} \qquad (10)$$

$$S''_{ij}=u_{ij} \qquad (11)$$

The subsequent halftoning process can be performed in the same manner as described for the case shown in FIGS. 5 and 6.

Either of of eqs. (8) and (9) may be combined with either one of eqs. (10) and (11) for obtaining the output image signal S". There is no particular limitation on which equations should be combined but the combination of eqs. (9) and (11) has the particular advantage that enhanced processing for sharpness can be achieved without causing a moiré pattern, whereby a very sharp halftone image can be reproduced.

As described in detail on the foregoing pages, when image information that contains a regular or periodic pattern as in the case where the original image is halftone image as in printed matter is to be read and reproduced as halftone image information, the present invention first smoothes the image information of interest, then performs first contrast-dependent processing for sharpness on the smoothed signal and finally subjects the sharpness signal to a halftone process. As a result, the edge portion that has high contrast and that experiences a change in image density is selectively enhanced to reproduce a sharp and moiré-free halftone image in which any noise and unwanted regular patterns are fully smoothed out.

If the smoothing step is performed with reference to a mask size that is equal or substantially equal to the pitch of the regular pattern or if the "S-substituted processing for sharpness" is combined with the processing for sharpness by unsharp making, a halftone image that has particularly high sharpness and that is completely free from moiré patterns can be obtained. If the regular pattern at issue has a small pitch, processing for normal sharpness is performed; if the pitch is coarse, subsampling of pixels is combined with the smoothing step and processing for sharpness is subsequently performed by unsharp masking. In this was, both monochromatic and color originals can be effectively processed with a small memory capacity and yet no moiré pattern is produced while significant improvement in image sharpness is achieved. If the first and second averaging masks are variable in size, the factor of scaling can be adjusted not only for reduction but also for enlargement to cover, for example, the range of 20–200%.

The image signal processing apparatus of the present invention is capable of achieving the advantages described above and yet it is simple in construction.

What is claimed is:

1. A method for processing image signals comprising the steps of:

determining an averaging mask size in accordance with a pitch of a periodic pattern in image information corresponding to said image signals, respectively, smoothing said image information containing said periodic pattern to obtain a first unsharpness signal, sharpening said first unsharpness signal to obtain a second unsharpness signal and halftoning said second unsharpness signal to form a halftone image signal, wherein said smoothing step is performed with reference to said averaging mask size.

2. A method according to claim 1 wherein said averaging mask size is computed in accordance with the pitch of said periodic pattern and a factor of scaling for conversion from an input to output image.

3. A method according to claim 2 wherein said averaging mask size is within a range from 0.8 to 1.2 times the product of the pitch of said periodic pattern and said factor of scaling.

4. A method according to claim 2 wherein said averaging mask size is within a range from 0.9 to 1.1 times the product of the pitch of said periodic pattern and said factor of scaling.

5. A method according to claim 1 wherein said averaging mask size is equal to the pitch of said periodic pattern.

6. A method for processing image signals comprising the steps of:

determining a mask size in accordance with a pitch of a periodic pattern in original image information corresponding to said image signals, respectively;

smoothing a readout of said original image information with reference to said mask size to obtain a first unsharpness signal;

smoothing said first unsharpness signal to obtain a second unsharpness signal;

determining the difference between said first unsharpness signal and said second unsharpness signal;

comparing said difference with a predetermined threshold value;

sharpening said first unsharpness signal to obtain an output image signal only when the absolute value of said difference is greater than said threshold value; and halftoning said output image signal.

7. A method according to claim 6, wherein when the absolute value of said difference is at most equal to said threshold value, one of said first unsharpness signal and said second unsharpness signal is directly delivered as an output image signal, which is then halftoned.

8. A method according to claim 6, wherein said mask size used in said first smoothing step is determined in accordance with the pitch of said periodic pattern and a factor of scaling for conversion from an input image signal to an output image signal.

9. A method according to claim 6 wherein the mask size used in said second smoothing step is variable.

10. An apparatus for processing image signals comprising:

a mask size computing circuit that determines a mask size in accordance with a pitch of periodic pattern in original image information corresponding to said image signals, respectively;

a first smoothing circuit that smoothes a readout of said original image information with reference to said mask size to obtain a first unsharpness signal;

a second smoothing circuit that smoothes said first unsharpness signal to obtain a second unsharpness signal;

a differential circuit that determines the difference between said first and second unsharpness signals;

a comparator circuit that compares the absolute value of said difference with a predetermined threshold value;

a sharpening circuit that sharpens said first unsharpness signal to obtain an output image signal when the absolute value of said difference is greater than said threshold value;

a circuit that directly delivers one of said first unsharpness signal and said second unsharpness signal as said output image signal when the absolute value of said difference is at most equal to said threshold value; and a halftoning circuit that halftones said output image signal.

11. A method according to claim 9, wherein a mask size used in said second smoothing step is determined in accordance with said mask size used in said first smoothing step.

12. A method according to claim 9, further comprising the step of determining a mask size of a mask, which is used in said second smoothing step, in accordance with the pitch of said periodic pattern of said original image information, a pitch of halftone dots of said halftoned output image signal and a predetermined capacity of a memory buffer storing said image information.

13. A method according to claim 9, wherein a mask size used in said second smoothing step is one of a normal mask size that is determined to provide optimal results in sharpness processing at said sharpening step when the pitch of the periodic pattern is small and an enlarged mask size greater than said normal mask size when the pitch of the periodic pattern is coarse.

14. A method according to claim 13, wherein said second smoothing step comprises the step of subsampling said first unsharpness signal when said enlarged mask size is used in said second smoothing step.

15. A method according to claim 6, wherein said sharpening step is the step for obtaining said output image signal by unsharp masking using said first and second unsharpness signals.

16. A method according to claim 6, wherein said sharpening step includes a first sharpening step to assign a maximum value and a minimum value to said image signals for a particular pixel for pixels within a predetermined range to a first sharpness signal in accordance with the difference between said first unsharpness signal and said second unsharpness signal, and a second sharpening step to obtain said output image signal by unsharp masking using said first sharpness signal and said second unsharpness signal.

17. A method according to claim 6, wherein said determining step is the step for selecting said mask size in accordance with the pitch of said periodic pattern and a factor of scaling for conversion from an input image signal to said output image signal, wherein said mask size is selected from among mask sizes previously computed in accordance with the pitch of various periodic patterns and various factors of scaling for conversion from input image signals to output image signals.

18. An apparatus according to claim 10, wherein said mask size used in said first smoothing circuit is determined by said mask size computing circuit.

19. An apparatus according to claim 18, wherein a mask size used in said second smoothing circuit is determined by said mask size computing circuit.

20. An apparatus according to claim 10, wherein said sharpening circuit comprises a first sharpening circuit that assigns a maximum value and a minimum value to said image signals for a particular pixel for pixels within a predetermined range to a first sharpness signal in accordance with the difference between said first unsharpness signal and said second unsharpness signal and a second sharpening circuit that performs processing for sharpness by unsharp masking using said first sharpness signal and said second unsharpness signal to obtain said output image signal.

21. An apparatus according to claim 10, wherein said mask size computing circuit determines said mask size by selecting said mask size in accordance with the pitch of said periodic pattern and a factor of scaling for conversion from an input image signal to said output image signal, wherein said mask size is selected from among mask sizes previously computed in accordance with the pitch of various periodic patterns and various factors of scaling for conversion from input image signals to output image signals.

* * * * *